United States Patent
Shirvanian et al.

(10) Patent No.: US 12,371,804 B2
(45) Date of Patent: Jul. 29, 2025

(54) PROTON EXCHANGE MEMBRANE-BASED ELECTROLYSER DEVICE AND METHOD FOR MANUFACTURING SUCH A DEVICE

(71) Applicant: Nederlandse Organisatie voor toegepast-natuurwetenschappelijk Onderzoek TNO, s-Gravenhage (NL)

(72) Inventors: Alireza Pezhman Shirvanian, 's-Gravenhage (NL); Ivan Garcia Torregrosa, 's-Gravenhage (NL)

(73) Assignee: Nederlandse Organisatie voor toegepast-natuurwetenschappelijk Onderzoek TNO, 's-Gravenhage (NL)

( * ) Notice: Subject to any disclaimer, the term of this patent is extended or adjusted under 35 U.S.C. 154(b) by 424 days.

(21) Appl. No.: 18/000,837

(22) PCT Filed: Jun. 10, 2021

(86) PCT No.: PCT/NL2021/050369
§ 371 (c)(1),
(2) Date: Dec. 6, 2022

(87) PCT Pub. No.: WO2021/251826
PCT Pub. Date: Dec. 16, 2021

(65) Prior Publication Data
US 2023/0323546 A1    Oct. 12, 2023

(30) Foreign Application Priority Data

Jun. 10, 2020 (EP) .................................. 20179268

(51) Int. Cl.
C25B 9/00    (2021.01)
C25B 9/23    (2021.01)
C25B 11/031    (2021.01)
C25B 11/054    (2021.01)

(52) U.S. Cl.
CPC .............. C25B 9/23 (2021.01); C25B 11/031 (2021.01); C25B 11/054 (2021.01)

(58) Field of Classification Search
CPC ........ C25B 9/23; C25B 11/031; C25B 11/054
See application file for complete search history.

(56) References Cited

U.S. PATENT DOCUMENTS

| 2004/0033410 A1 | 2/2004 | Brady et al. |
| 2008/0283412 A1 | 11/2008 | Giddey et al. |
| 2019/0016616 A1 | 1/2019 | Harvey et al. |

FOREIGN PATENT DOCUMENTS

EP    3 660 186 A1    6/2020

*Primary Examiner* — Zulmariam Mendez
(74) *Attorney, Agent, or Firm* — N.V. Nederlandsch Octrooibureau

(57) ABSTRACT

A proton exchange membrane-based electrolyser includes an anode, a cathode and a proton exchange membrane, with the anode at a first surface of the membrane and the cathode at a second opposite surface.
The anode includes an anodic catalyst layer and an anodic porous transport layer in parallel, with the catalyst layer between the transport layer and the first surface. The cathode includes a cathodic catalyst layer and a cathodic porous transport layer in parallel, with the catalyst layer between the transport layer and the second surface. The electrolyser includes conductive first and second meshes at the side of the anode and the side of the cathode, in which a surface of the first mesh covers the surface of the anodic catalyst layer, and in which a surface of the second mesh covers the surface of the cathodic catalyst layer.

14 Claims, 4 Drawing Sheets

PROTON EXCHANGE MEMBRANE-BASED ELECTROLYSER DEVICE AND METHOD FOR MANUFACTURING SUCH A DEVICE

FIELD OF THE INVENTION

The present invention relates to a proton exchange membrane-based electrolyser device. Also, the invention relates to a method for manufacturing such a device.

BACKGROUND ART

Proton exchange membrane-based electrolysers (PEMWE's) have been considered one of the most promising devices for hydrogen generation and energy storage from water splitting, especially when coupled with sustainable energy resources such as those from wind and solar energy. Typically, prior art PEMWE's comprise components such as Bipolar Plates (BPP), Porous Transport Layer (PTL), Catalyst Layer (CL) and Proton Exchange Membrane (PEM). The catalyst layer is typically coated onto the PEM. The PTL is for the transport of liquid material from the bipolar plate to the PEM. The catalyst at the anode side typically consists of Iridium (Ir) or Ruthenium (Ru) or Ir—Ru alloy. The catalyst at the cathode side typically consists of Platinum (Pt). Each of the metals has relatively low abundance in the Earth and thus available only at high cost.

Because of this, a better utilisation of these catalyst materials (in lower amounts) in electrolysers is desirable. However, by reducing the amounts of the catalyst metals in the electrolyser (i.e., lower loadings of catalyst material) PEMWE's suffer from low catalyst utilisation and high Ohmic resistance across the electrolyser's components and in particular within CL. By reducing the amount of catalyst to form a layer, interruptions/discontinuities within the catalyst layer can occur. As a consequence, regions within the catalyst layer become inhomogeneous with concomitant formation of small catalyst patches/islands which may become electrically disconnected/isolated from each other and the PTL due to the reduction in catalyst loading. Consequently, isolated catalyst particles will not be able to contribute effectively to the PEMWE electrochemical reactions, resulting in poor catalyst utilisation. Furthermore, electrically disconnected catalyst layers/patches will lead to substantially higher overall Ohmic resistance in PEMWE with relatively higher requisite PEMWE electrical power and thus reduced efficiency.

Electrochimica Acta 316 (2019) 43-51 describes performance improvement of proton exchange membrane electrolyser cells by introducing in-plane transport enhancement layers. The PTL's are embodied as perforated sheets with straight through circular holes made on thin Titanium sheets. Dual layers of these PTL's are used with a layer with large pores (830 micron) stacked on top of a layer with smaller pore sizes (100 micron) to improve mass transport. However, no changes in the kinetics or catalyst utilisation are reported. The transport enhancement is claimed to be due to mass transport up to moderate current densities (2 Amps/$cm^2$) mostly in through-plane direction (perpendicular to plane of PTL) and reduced Ohmic resistance. While catalyst materials laying underneath the pores will experience enhanced mass transport, the catalyst materials underneath the PTL's base-plate rely on in-plane mass transport which is not facilitated at the CL using this design. Therefore, it is envisaged that at higher current densities where mass transport resistance also becomes dominant, these areas of CL will be deprived of reactants and thus poor catalyst utilisation results. On the other hand, with reduced catalyst loading and occurrence of inhomogeneous CL, the isolated patches of catalyst materials underneath the pores are electrically disconnected from PTL and thus will not be able to effectively participate in the electrochemical reaction. The latter also results in poor catalyst utilisation.

Therefore, it is an objective to reduce the high overall Ohmic and mass transport resistance across the components to minimise the required electrical power needed to run the PEMWE's while at the same time improving catalyst utilisation and kinetics. With better utilisation of catalyst material, using ultra-low loadings of catalyst material becomes feasible which can further drive down the cost of PEMWE's and improve the prospects of this technology for widespread adoption among clean energy technologies.

SUMMARY OF THE INVENTION

The objective is achieved by a proton exchange membrane-based electrolyser comprising an anode portion, a cathode portion and a proton exchange membrane;
the anode portion arranged at a first surface side of the membrane and the cathode portion arranged at a second opposite surface side of the membrane;
the anode portion comprising an anodic catalyst layer and an anodic porous transport layer; the anodic catalyst layer being arranged between the anodic porous transport layer and the first surface side, the cathode portion comprising a cathodic catalyst layer and a cathodic porous transport layer; the cathodic catalyst layer being arranged between the cathodic porous transport layer and the second surface side,
wherein the electrolyser comprises a conductive first mesh foil and/or a conductive second mesh foil, the conductive first mesh foil being stacked on the anodic catalyst layer such that a surface of the mesh foil covers the surface of the anodic catalyst layer in a first covered area and providing a first conducting interface between the mesh foil and the anodic catalyst layer in the first covered area, the conductive second mesh foil being stacked on the cathodic catalyst layer such that a surface of the mesh foil covers the surface of the cathodic catalyst layer in a second covered area and providing a second conducting interface between the mesh foil and the cathodic catalyst layer in the second covered area. The respective mesh foil is arranged in one of the following four ways. First, the mesh foil may be arranged between the anodic catalyst layer and the proton exchange membrane. Second, the mesh foil may be arranged between the cathodic catalyst layer and the proton exchange membrane. Third, the mesh foil may be arranged between the anodic catalyst layer and the porous transport layer. Fourth, the mesh foil may be arranged between the cathodic catalyst layer and the porous transport layer.

Advantageously, the conductive first and/or second mesh foil provides a lateral (in-plane) shunting of the associated catalyst layer. In a relatively thin catalyst layer, the catalyst layer may become discontinuous in which regions of the catalyst layer may not be electrically connected to each other. The conductive mesh foil which is attached to the catalyst layer provides a conductive shunt which creates electrical connections between the regions in the catalyst layer. As a result, any disconnected regions that would not contribute in the electrolysis are now electrically connected and become effective. Additionally, the Ohmic resistance is reduced which in turn reduces the requisite electric power to drive the electrolyser.

The invention also relates to a method for manufacturing such a proton exchange membrane-based electrolyser comprising an anode portion, a cathode portion and a proton exchange membrane, the anode portion arranged at a first surface side of the membrane and the cathode portion arranged at a second opposite surface side of the membrane; the method comprising:

providing an anodic catalyst layer and an anodic porous transport layer in the anode portion while arranging the anodic catalyst layer between the anodic porous transport layer and the first surface side, providing a cathodic catalyst layer and a cathodic porous transport layer in the cathode portion while arranging the cathodic catalyst layer between the cathodic porous transport layer and the second surface side, wherein the method further comprises:

providing a conductive first mesh foil at the side of the anode portion and stacking the conductive first mesh foil on the anodic catalyst layer such that a first overlap between the surface of the mesh foil and the surface of the anodic catalyst layer is formed with a first conducting interface between the mesh foil and the anodic catalyst layer across the first overlap, wherein the conductive first mesh foil is arranged between the anodic catalyst layer and the proton exchange membrane or between the anodic catalyst layer and the porous transport layer, and/or providing a conductive second mesh foil at the side of the cathode portion and stacking the conductive second mesh foil on the cathodic catalyst layer such that a second overlap between the surface of the mesh foil and the surface of the cathodic catalyst layer is formed with a second conducting interface between the mesh foil and the cathodic catalyst layer across the second overlap, wherein the conductive second mesh foil is arranged between the cathodic catalyst layer and the proton exchange membrane or between the cathodic catalyst layer and the porous transport layer.

Advantageous embodiments are further defined by the dependent claims.

BRIEF DESCRIPTION OF DRAWINGS

The invention will be explained in more detail below with reference to drawings in which illustrative embodiments thereof are shown. The drawings are intended exclusively for illustrative purposes and not as a restriction of the inventive concept which is to cover all modifications, equivalents, and alternatives falling within the scope of the present invention. The scope of the invention is only limited by the definitions presented in the appended claims.

DESCRIPTION OF EMBODIMENTS

In an electrolyser a splitting reaction of molecules such as water takes place. The splitting reaction consists of two half-reactions: one half-reaction at a cathode electrode takes place while electrons are donated by (added from) the cathode, the other half-reaction at an anode electrode takes place while electrons are removed by the anode.

As an example, for the electrolysis of water, in acidic environment the anodic half reaction is given by:

$$2H_2O(l) \rightarrow O_2(g) + 4H^+(aq) + 4e^- \quad \text{(eq. 1)}$$

With l: liquid, g: gas; aq: in aqueous, and $e^-$: electron

The cathodic half reaction is given by:

$$2H^+(aq) + 2e^- \rightarrow H_2(g) \quad \text{(eq. 2)}$$

The overall reaction is given by:

$$2H_2O(l) \rightarrow O_2(g) + 2H_2(g) \quad \text{(eq. 3)}$$

According to the reaction (eq. 1 to eq. 3) oxygen gas is produced at the anode and hydrogen gas is produced at the cathode of the electrolyser while protons ($H^+$) are transported from the anode to the cathode.

Figure 1:
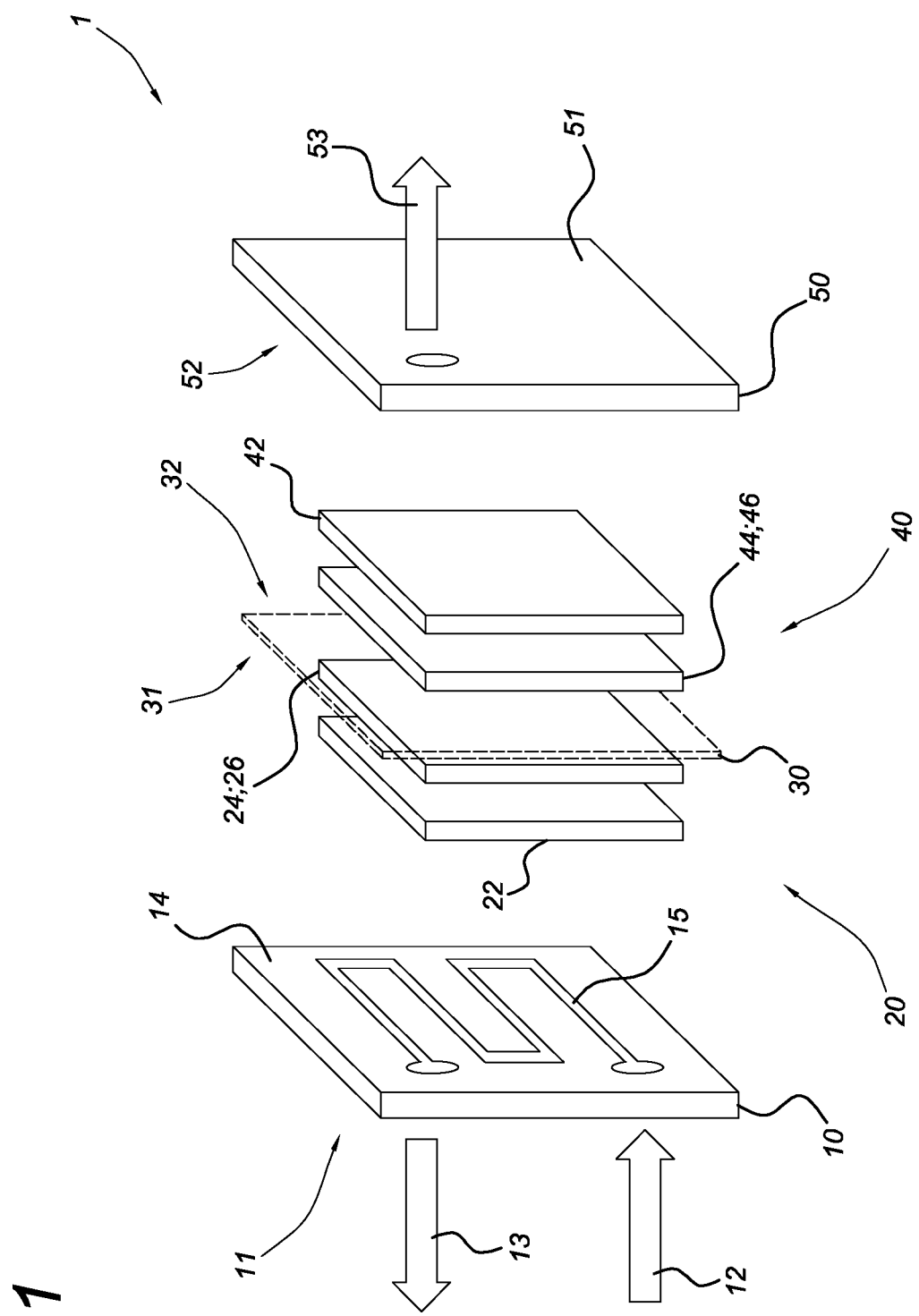
FIG. 1 schematically shows an exploded view of a proton exchange membrane-based electrolyser in accordance with an embodiment of the invention.

FIG. 1 schematically shows an exploded view of a proton exchange membrane-based electrolyser 1 in accordance with an embodiment of the invention.

The proton exchange membrane-based electrolyser 1 is a stacked structure which comprises an anode portion 20, a cathode portion 40, a proton exchange membrane 30, a first bipolar plate 10 and a second bipolar plate 50. The anode portion 20, the cathode portion 40 and the proton exchange membrane 30 are arranged between the first bipolar plate 10 and the second bipolar plate 50.

The proton exchange membrane 30 is a central portion of the electrolyser which allows passage of protons ($H^+$) from the anode portion (i.e., the volume where the anode reaction takes place) to the cathode portion (the volume where the cathode reaction takes place).

The anode portion 20 is arranged in between the first bipolar plate 10 and a first membrane surface 31 of the proton exchange membrane 30.

The cathode portion 40 is arranged in between a second membrane surface 32 of the proton exchange membrane 30, opposite to the first surface thereof, and the second bipolar plate 50.

The first bipolar plate is configured at an outer surface 11 with an inlet 12 for water and an outlet 13 for oxygen gas and unreacted water. At an inner surface 14 of the first bipolar plate 10 a channel structure 15 is provided for the transport of the water into the anode portion 20 and oxygen gas from the anode portion 20.

The second bipolar plate 50 is configured at an outer surface 51 with an outlet 53 for hydrogen gas. At an inner surface 52 of the second bipolar plate 50 a second channel structure (not shown) is provided for the transport of hydrogen gas from the cathode portion. It will be appreciated that in some embodiments the cathode 50 may also have a water inlet (not shown here).

The anode portion 20 comprises a stack of an anodic porous transport layer 22, an anodic catalyst layer 24 and a conductive first mesh foil 26, in which the anodic porous transport layer 22 is arranged between the first bipolar plate 10, bordering on the first channel structure 15, and the combination of the first mesh foil 26 and anodic catalyst layer 24. The combination of the first mesh foil 26 and the anodic catalyst layer 24 is bordering on the first membrane surface 31 of the proton exchange membrane 30. The anodic catalyst layer 24 and the anodic porous transport layer 22 may be in parallel to each other or essentially in parallel to each other.

In a similar manner, the cathodic portion 40 comprises a stack of a cathodic porous transport layer 42, a cathodic catalyst layer 44 and a conductive second mesh foil 46, in which the cathodic porous transport layer 42 is arranged between the second bipolar plate 50, bordering on the second channel structure 54, and the combination of the second mesh foil 46 and the cathodic catalyst layer 44. The combination of the second mesh foil 46 and the cathodic catalyst layer 44 is bordering on the second membrane surface 32 of the proton exchange membrane 30. The cathodic catalyst layer 44 and the cathodic porous transport layer 42 may be in parallel to each other or essentially in parallel to each other.

According to an embodiment, the conductive first mesh foil 26 is stacked on the anodic catalyst layer 24 which creates a first covered area in which a surface of the first mesh foil covers and contacts a surface of the anodic catalyst layer. In this manner, the first mesh foil provides a lateral shunt between regions of the anodic catalyst layer which during use of the electrolyser 1 can supply current (remove electrons to an external current source, not shown here) to all shunted regions of the anodic catalyst layer. By the lateral shunt interruptions/discontinuities in the anodic catalyst layer between regions are connected and the effective area of the anodic catalyst layer is enlarged.

Similarly, according to an embodiment, the conductive second mesh foil 46 is stacked on the cathodic catalyst layer 44 which creates a second covered area in which a surface of the second mesh foil covers and contacts a surface of the cathodic catalyst layer. Likewise, the second mesh foil provides a lateral shunt between regions of the cathodic catalyst layer which during use of the electrolyser 1 can supply current to all shunted regions of the cathodic catalyst layer. The effective active area of the cathodic catalyst layer is enlarged, in the same manner as explained above for the anodic catalyst layer.

The arrangement of the conductive mesh foil 26; 46 and the associated catalyst layer 24; 44 between the porous transport layer 22; 42 and the proton exchange membrane 30 is further discussed with reference to FIGS. 3A and 3B.

Figure 2:
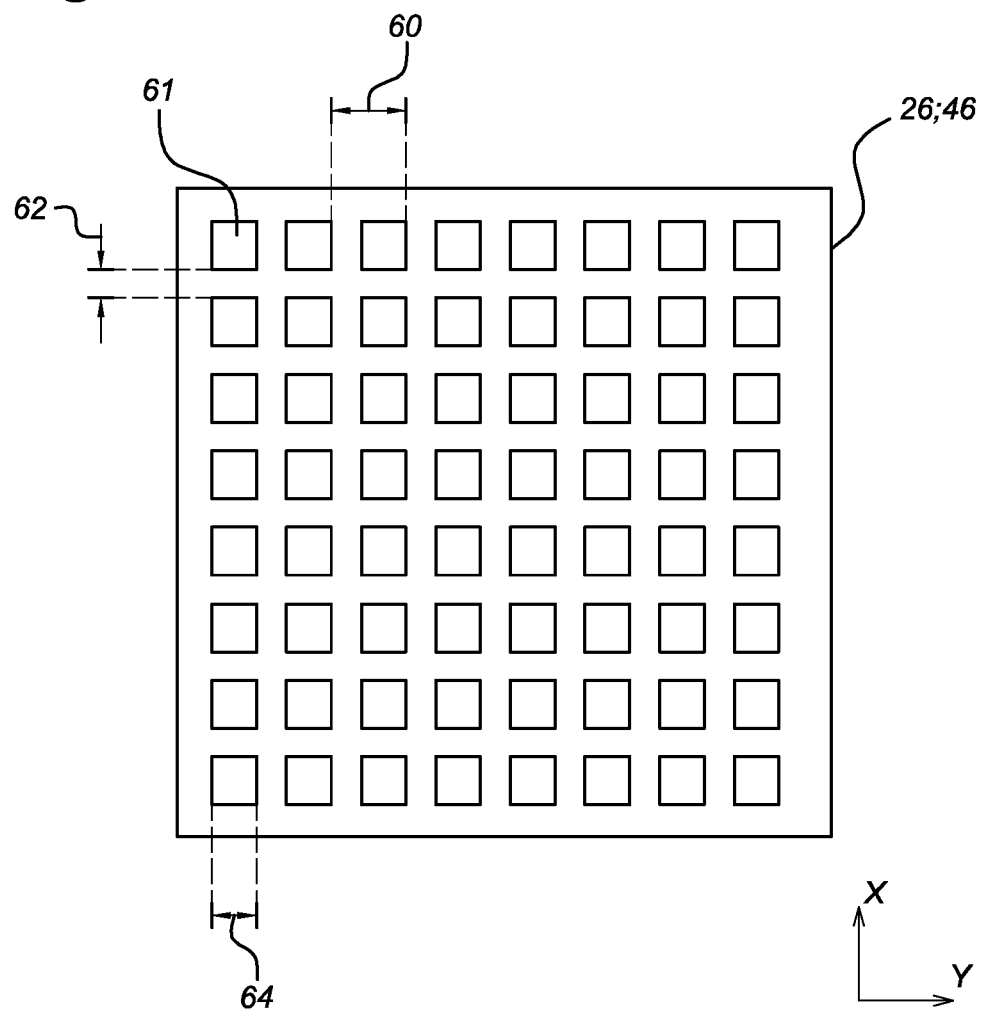
FIG. 2 schematically shows a plane view of a conductive mesh foil for a proton exchange membrane-based electrolyser according to an embodiment of the invention.

FIG. 2 schematically shows a plane view of a conductive mesh foil for a proton exchange membrane-based electrolyser according to an embodiment of the invention The conductive mesh foil as shown can be used with both the cathodic catalyst layer and the anodic catalyst layer.

The mesh foil 26; 46 is a conductive foil typically made from a metal selected from a group comprising Gold (Au), Silver (Ag), Chromium (Cr), Niobium (Nb), Zirconium (Zr), and Tantalum (Ta), Vanadium (V), Hafnium (Hf) and in general a valve metal. Also, the metal may be selected from the Platinum group (ruthenium, rhodium, palladium, osmium, iridium, and platinum).

Alternatively, the mesh foil may be made from a conductive compound selected from the conductive oxide, nitride, boride and carbide groups, comprising Titanium nitride (TiN), Niobium nitride (NbN), Titanium carbide (TiC), Tungsten carbide (WC), Titanium di-boride (TiB2). Furthermore, the mesh could be made of low-cost base material, such as Stainless Steel (SS), and coated with one or more valve metals and their derivatives.

It will be appreciated that the mesh foil can additionally be made from other metals or metallic compounds that are compatible with the electrolysis process.

According to an embodiment, the surface(s) of the mesh foil may additionally be configured or capable of conducting protons.

According to an embodiment, the mesh foil has a layout as schematically shown in FIG. 2. In FIG. 2 as an example a two-dimensional array of mesh openings with an orthogonal distribution of the openings is shown.

The mesh foil 26; 46 is a foil provided with a mesh formed by a plurality of mesh openings 61 with spacings 62 between the openings. The mesh openings are preferably ordered in an array such that both the openings and the spacings are lined up. Such an array is for example a two-dimensional array of the mesh openings with a size of the opening between 1 and 30 μm with a density of the spacings 62 between about 500 to 3000 lines per inch (196 lines/cm to 1181 lines/cm). By using such relatively small spacings a coverage of the mesh foil on the catalyst layer is achieved which bridges any interruptions/discontinuities in the catalyst layer of comparable or bigger size and increases the effective active area of the catalyst layer accordingly.

According to a further embodiment, the mesh foil 26; 46 is provided with mesh openings 61 between about 0.5 and about 30 μm, preferably about 1 and about 30 μm, more preferably between about 1 and about 20 μm, more preferably between about 5 and about 10 μm or between about 0.5 and about 10 μm. The mesh foil 26; 46 may have a width of lines 62 between neighbouring mesh openings 61 between about 1 and about 10 μm. The distance between any two neighbouring mesh openings in the mesh may be between about 1 and about 10 μm.

According to an embodiment, the mesh foil 26; 46 has a thickness between about 50 nm and about 25 μm and preferably between 1 to 3 μm.

In an embodiment, the openings are distributed along two orthogonal directions each with 1000 lines/inch (392 lines/cm), each opening having a width 64 of about 18 μm, with line separation (line width 62) of about 7 μm.

In an alternative embodiment, the openings are distributed along two orthogonal directions with 2000 lines/inch (788 lines/cm), each opening having a width 64 of about 8 μm, with line separation (line width 62) of about 5 μm.

Figure 3A:
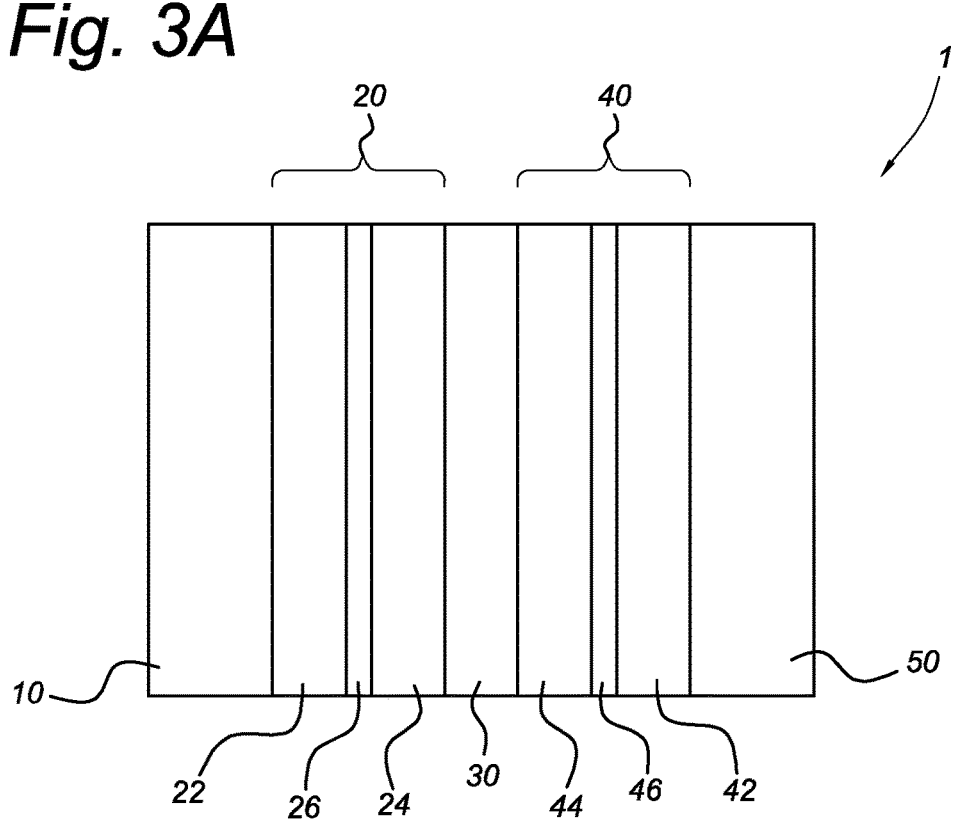
FIGS. 3A, 3B schematically show an arrangement of layers of a proton exchange membrane-based electrolyser according to an embodiment of the invention.
Figure 3B:
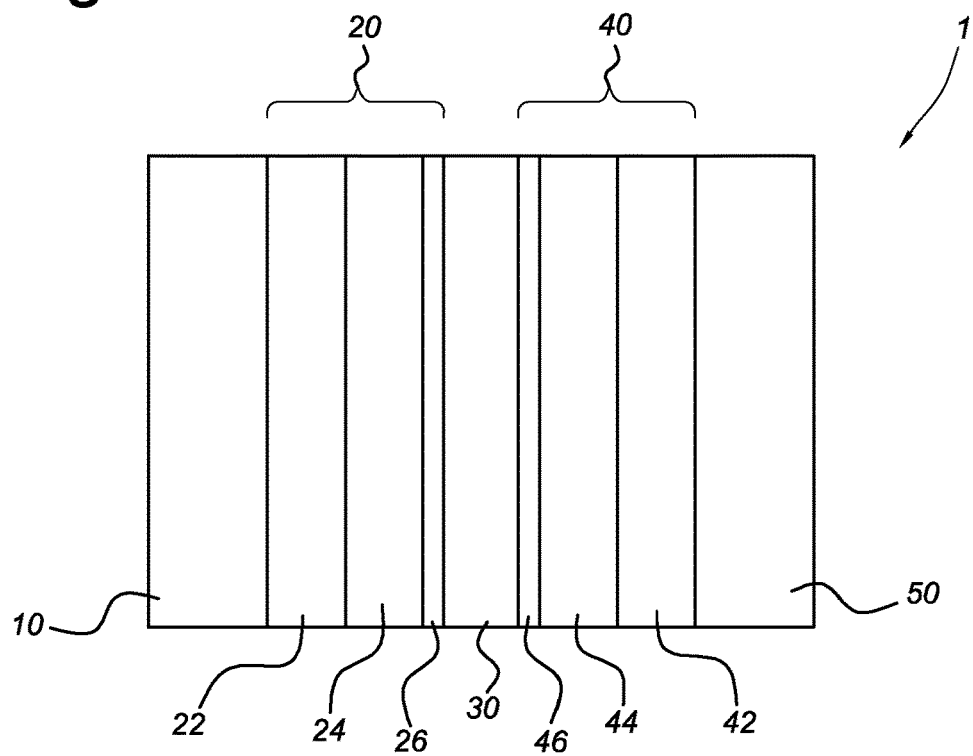

FIG. 3A, 3B schematically show an arrangement of layers of a proton exchange membrane-based electrolyser according to an embodiment of the invention.

The arrangement of the mesh foil 26; 46 and the catalyst layer 24; 44 between the porous transport layer 22; 42 and the proton exchange membrane 30 can be achieved in alternative manners. The electrolyser may comprise 1, 2, 3 or 4 mesh foils. One or both of mesh foils 26; 46 may be arranged between the porous transport layer 22; 42 and the catalyst layer 24; 44. In this case, the catalyst layer 24; 44 can be arranged directly on a surface of the proton exchange membrane 30. One or both of mesh foils 26; 46 may be arranged between the catalyst layer 24; 44 and the porous transport layer 22. In this case, the one or both mesh foils 26; 46 can be arranged directly on the surface of the proton exchange membrane 30.

As shown schematically in FIG. 3A, the mesh foil 26; 46 is arranged between the porous transport layer 22; 42 and the catalyst layer 24; 44. The catalyst layer 24; 44 is arranged directly on a surface of the proton exchange membrane 30.

FIG. 3B schematically shows the alternative arrangement in which the mesh foil 26; 46 is arranged directly on the surface of the proton exchange membrane 30 and the catalyst layer 24; 44 is arranged between the porous transport layer 22; 42 and the mesh foil 26; 46.

The configuration as shown in FIG. 3A has an additional advantage that the mesh foil structure which consists of a thin metal foil that accordingly is provided with a relatively high flexibility, in which the stiffness of the foil material is less than the stiffness of the PTL material, in other words the foil is more flexible and malleable than the PTL. Due to this difference in flexibility the mesh foil can conform to the roughness of the PTL and thus increase size and number of contact points. This in turn will result in further reduction of contact resistance and Ohmic losses with overall enhancements in PEMWE efficiency. In addition, the mesh 26; 46 between the porous transport layer 22; 42 and the catalyst layer 24; 44 forms a protective layer on the membrane 30.

The configuration as shown in FIG. 3B has an additional advantage that it can be created using ultra-thin membranes (<50 micron) to reduce the overall Ohmic resistance in PEMWE cells and improve efficiency significantly.

The arrangement of the mesh foil and the catalyst layer on the cathode side may be the same as the arrangement of the mesh foil and the catalyst layer on the anode side: either with the catalyst layer directly on the proton exchange membrane or the mesh foil directly on the proton exchange membrane. It is also conceivable that the arrangement of the mesh foil and the catalyst layer on the cathode side opposite to the arrangement of the mesh foil and the catalyst layer on the anode side.

It is noted that in a further embodiment, the catalyst layer on the cathode side and/or on the anode side is sandwiched between two parallel mesh foils. One of the mesh foils is directly arranged on the proton exchange membrane while the other of the two mesh foils is between the catalyst layer and the porous transport layer.

In some embodiments the mesh foil has a larger electronic conductivity value than the adjacent catalyst layer, for example at least about 25% larger.

Figure 4:
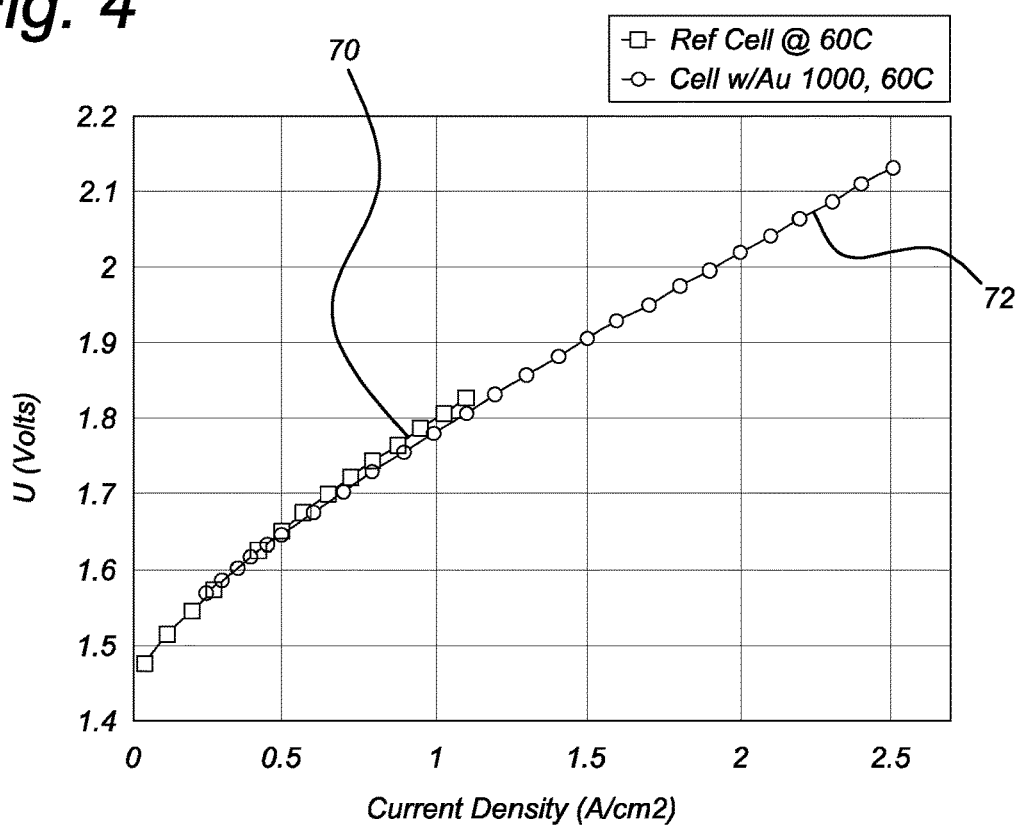
FIG. 4 shows experimental polarisation curves for a proton exchange membrane-based electrolyser according to an embodiment and a proton exchange membrane-based electrolyser according to the prior art.

FIG. 4 shows experimental polarisation curves for electrolysis of water by means of a proton exchange membrane-based electrolyser according to an embodiment and a proton exchange membrane-based electrolyser according to the prior art.

The proton exchange membrane-based electrolyser according to an embodiment of the invention was equipped with gold mesh foils (one at the cathode and one at the anode) with 1000 lines per inch (392 lines per cm), mesh openings having a width of 18 μm and line width of 7 μm. The active area of the proton exchange membrane-based electrolyser was 10 cm². As anode Iridium was used (2.5 mg/cm²). As cathode platinum was used (0.5 mg/cm²). The proton exchange membrane was made from 'Nafion 117'.

As porous transport layer Bekaert Ti cloth was used.

The proton exchange membrane-based electrolyser of the prior art has same active area, with same areal density of anode and cathode. The membrane was also made from 'Nafion 117'. Same porous transport layer Ti cloth was used.

Water having neutral pH was used as source. The electrolysis reaction was carried out at 60° C. in each electrolyser.

In FIG. 4 the polarisation curves show the electrical potential difference between cathode and anode as a function of the current density (i.e. current divided by the electrode area). The polarisation curve 70 of the prior art electrolyser cell is depicted by a line carrying crosses. The polarisation curve 72 of the proton exchange membrane-based electrolyser cell according to the invention is depicted by a line carrying circles.

As can be seen, the polarisation curve 70 of the prior art electrolyser cell is above the polarisation curve 72 of the proton exchange membrane-based electrolyser cell according to the invention: at the same current density the potential difference between cathode and anode is larger for the prior art electrolyser. The potential U (Volts) requisite to generate a certain current density (corresponding to hydrogen generation rate) is lower for the cells equipped with mesh foil than for the cells from the prior art. This, in turn, means lower consumption of electric power and thereby higher efficiency.

Figure 5:
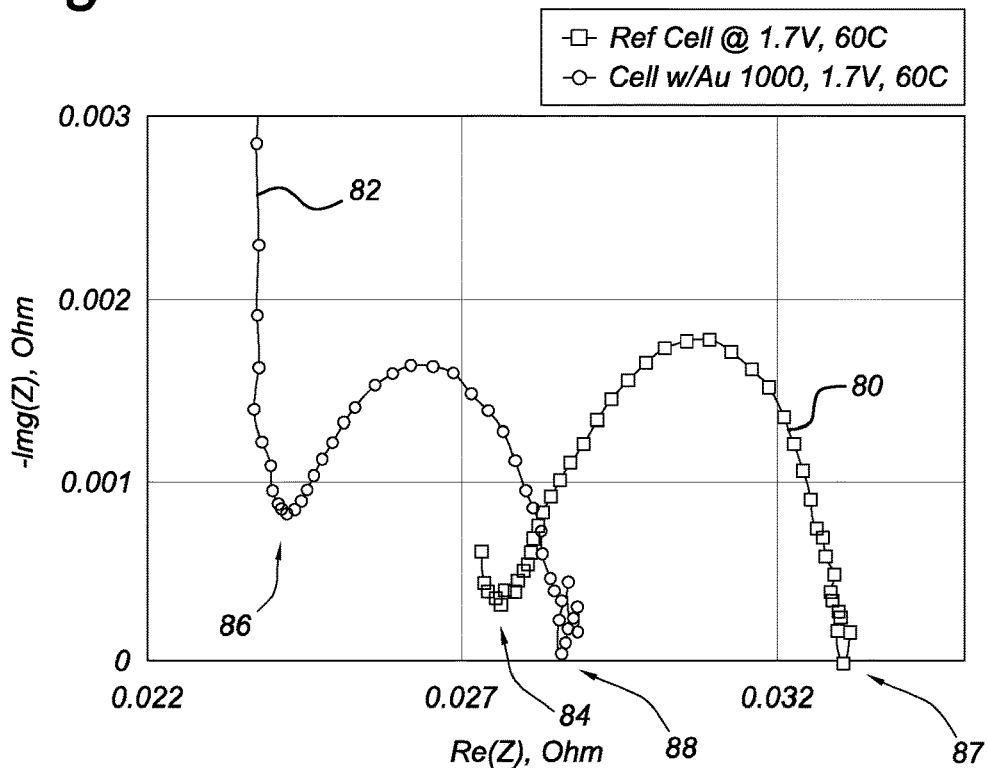
FIG. 5 shows experimental electrochemical impedance spectroscopy (EIS) plots for a proton exchange membrane-based electrolyser according to an embodiment and a proton exchange membrane-based electrolyser according to the prior art.

FIG. 5 shows experimental electrochemical impedance spectroscopy (EIS) plots for electrolysis of water by means of a proton exchange membrane-based electrolyser according to an embodiment and a proton exchange membrane-based electrolyser according to the prior art.

In FIG. 5, the EIS curves show the electrical impedance of the respective electrolyser cell in the complex plane. The EIS curve 80 of the prior art electrolyser cell is depicted by a line carrying crosses. The EIS curve 82 of the proton exchange membrane-based electrolyser cell according to the invention is depicted by a line carrying circles.

The EIS measurements were done under the same experimental conditions as described above with reference to FIG. 4.

In FIG. 5, the real part Re(z) axis intercept at high frequency (indicated by arrows 84 and 86) represents a "High Frequency Resistance" that needs to be minimal for better conductivity and efficiency. As shown, at cell temperature of 60° C., 1.7 V, the electrolyser according to the invention has HFR=0.024 Ohm (arrow 84) and the prior art electrolyser has HFR=0.0276 Ohm (arrow 86). Furthermore, the low frequency resistance (LFR), upon utilisation of the mesh according to this invention drops from 0.033 Ohm (arrow 87) to 0.0285 ohm (arrow 88).

Although in the preceding specification electrolysis processes relating to water splitting have been mentioned, electrolysis and electrolyser cells are not limited to water splitting processes but can also be used in relation to various electrochemical processes as known to the skilled in the art, such as Carbon dioxide ($CO_2$) reduction, Ammonia ($NH_3$) production and Hydrogen peroxide ($H_2O_2$) generation.

Also, it is noted that the experimental data for the electrolyser cell according to embodiments as described above are only examples for illustration of the invention.

The present invention may be embodied in other specific forms without departing from its essential characteristics. The described embodiments are to be considered in all respects only as illustrative and not restrictive to the inventive concept. The scope of the invention is, therefore, indicated by the appended claims rather than by the foregoing description. It will be apparent to the person skilled in the art that alternative and equivalent embodiments of the invention can be conceived and reduced to practice. In addition, many modifications may be made to adapt a particular configuration or material of the electrolyser to the teachings of the invention without departing from the essential scope thereof.

All modifications which come within the meaning and range of equivalency of the claims are to be embraced within their scope.

The invention claimed is:

1. Proton exchange membrane-based electrolyser comprising an anode portion, a cathode portion and a proton exchange membrane;
   the anode portion arranged at a first surface side of the membrane and the cathode portion arranged at a second opposite surface side of the membrane;
the anode portion comprising an anodic catalyst layer and an anodic porous transport layer; the anodic catalyst layer being arranged between the anodic porous transport layer and the first surface side,
   the cathode portion comprising a cathodic catalyst layer and a cathodic porous transport layer; the cathodic catalyst layer being arranged between the cathodic porous transport layer and the second surface side,
   wherein the electrolyser comprises a conductive first mesh foil and/or a conductive second mesh foil,
   the conductive first mesh foil being stacked on the anodic catalyst layer such that a surface of the mesh foil covers the surface of the anodic catalyst layer in a first covered area and providing a first conducting interface between the mesh foil and the anodic catalyst layer in the first covered area,
   the conductive second mesh foil being stacked on the cathodic catalyst layer such that a surface of the mesh foil covers the surface of the cathodic catalyst layer in a second covered area and providing a second conducting interface between the mesh foil and the cathodic catalyst layer in the second covered area,
   wherein either the respective mesh foil is arranged between the anodic catalyst layer and the proton exchange membrane or between the cathodic catalyst layer and the proton exchange membrane,
   or the respective mesh foil is arranged between the anodic catalyst layer and the porous transport layer or between the cathodic catalyst layer and the porous transport layer.

2. Proton exchange membrane-based electrolyser according to claim 1, wherein the respective mesh foil is provided with mesh openings arranged in a two-dimensional array with a spacing between each adjacent mesh openings.

3. Proton exchange membrane-based electrolyser according to claim 1, wherein the respective mesh foil is provided with mesh openings with a size between 0.5 and 20 µm.

4. Proton exchange membrane-based electrolyser according to claim 2, wherein in the respective mesh foil the spacing of the mesh openings has a density between 500 and 3000 lines per inch, 196 lines/cm to 1181 lines/cm.

5. Proton exchange membrane-based electrolyser according to claim 4, wherein the respective mesh foil has a width of lines between neighbouring mesh openings between 0.5 and 10 µm.

6. Proton exchange membrane-based electrolyser according to claim 1, wherein the respective mesh foil is capable of proton transport along the conducting interface.

7. Proton exchange membrane-based electrolyser according to claim 1, wherein the respective mesh foil comprises at least a layer of a conductive material;
   the conductive material being selected from:
      either a group of metals comprising gold, silver, chromium, niobium, zirconium tantalum, hafnium, and vanadium, valve metals,
      or a group of metals from the platinum group,
      or a group of carbides, nitrides and borides of transition metals or mixture/layers thereof.

8. Proton exchange membrane-based electrolyser according to claim 1, wherein the mesh foil has an electronic conductivity relatively larger than the electronic conductivity of the porous transport layer.

9. Proton exchange membrane-based electrolyzer according to claim 1, wherein a stiffness of the foil material is less than a stiffness of the PTL material.

10. Proton exchange membrane-based electrolyser according to claim 1, wherein the respective mesh foil further comprises a base material layer, the base material being either a conductive or a non-conductive base material and the at least one layer of the conductive material is arranged on a surface of the base material layer.

11. Proton exchange membrane-based electrolyser according to claim 1, wherein the respective mesh foil further comprises a base material layer, the base material being either a conductive or a non-conductive base material and the base material layer is covered on each of the surfaces thereof by a layer of the conductive material.

12. Proton exchange membrane-based electrolyser according to claim 1, wherein the respective mesh foil is arranged for laterally shunting the catalyst layer on which the mesh foil is arranged.

13. Proton exchange membrane-based electrolyser according to claim 1, wherein the respective mesh foil has a thickness between 50 nm and 25 µm.

14. Method for manufacturing a proton exchange membrane-based electrolyser comprising an anode portion, a cathode portion and a proton exchange membrane,
   the anode portion arranged at a first surface side of the membrane and the cathode portion arranged at a second opposite surface side of the membrane;
   the method comprising:
      providing an anodic catalyst layer and an anodic porous transport layer in the anode portion while arranging the anodic catalyst layer between the anodic porous transport layer and the first surface side,
      providing a cathodic catalyst layer and a cathodic porous transport layer in the cathode portion while arranging the cathodic catalyst layer between the cathodic porous transport layer and the second surface side,
   wherein the method further comprises:
      providing a conductive first mesh foil at the side of the anode portion and stacking the conductive first mesh foil on the anodic catalyst layer such that a first overlap between the surface of the mesh foil and the surface of the anodic catalyst layer is formed with a first conducting interface between the mesh foil and the anodic catalyst layer across the first overlap, wherein the conductive first mesh foil is arranged between the anodic catalyst layer and the proton exchange membrane or between the anodic catalyst layer and the porous transport layer, and/or
      providing a conductive second mesh foil at the side of the cathode portion and stacking the conductive second mesh foil on the cathodic catalyst layer such that a second overlap between the surface of the mesh foil and the surface of the cathodic catalyst layer is formed with a second conducting interface between the mesh foil and the cathodic catalyst layer across the second overlap,
   wherein the conductive second mesh foil is arranged between the cathodic catalyst layer and the proton exchange membrane or between the cathodic catalyst layer and the porous transport layer.

* * * * *